This invention relates to means for indicating a loss of pressure within two or more pressurized rotor blades of a helicopter.

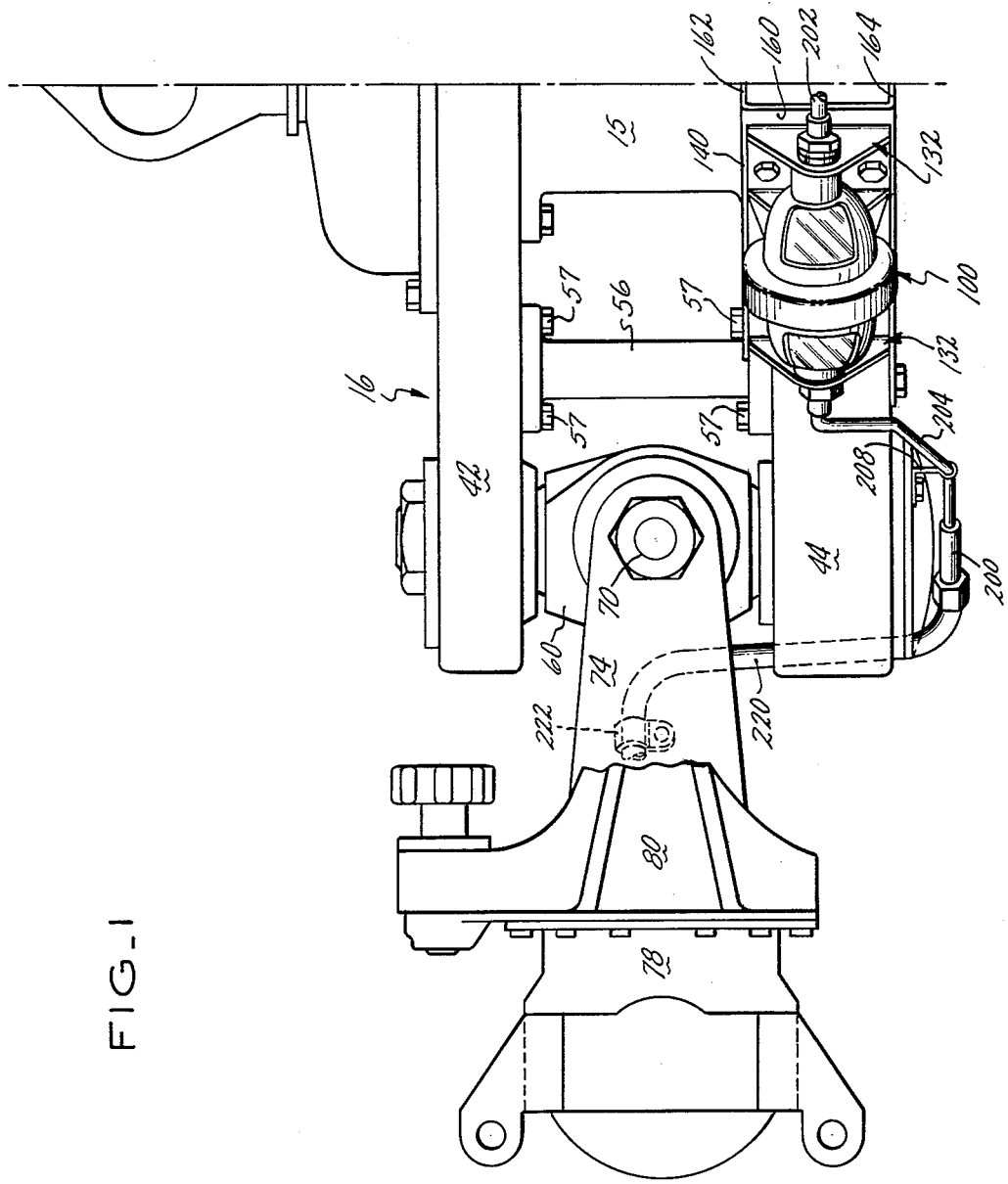

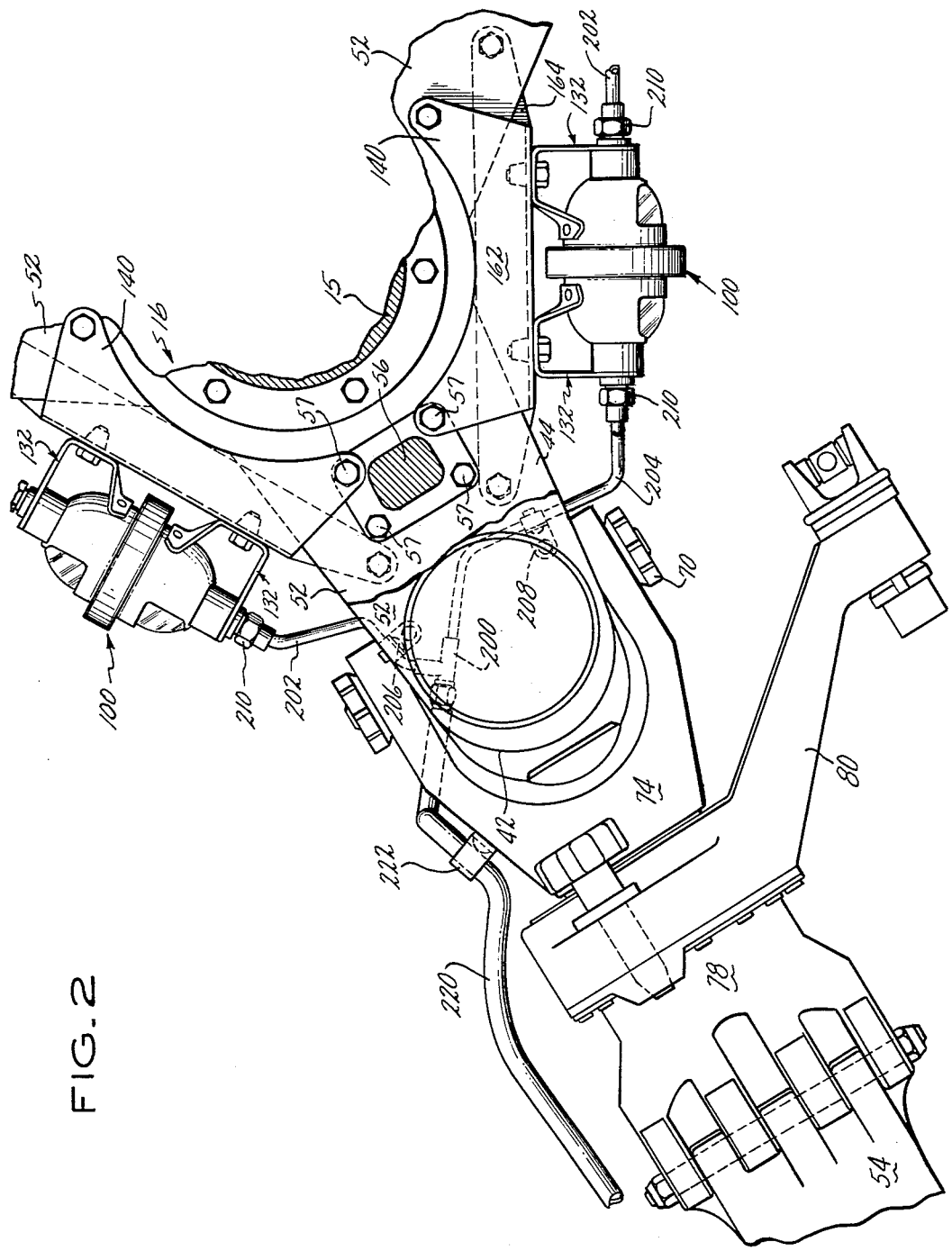

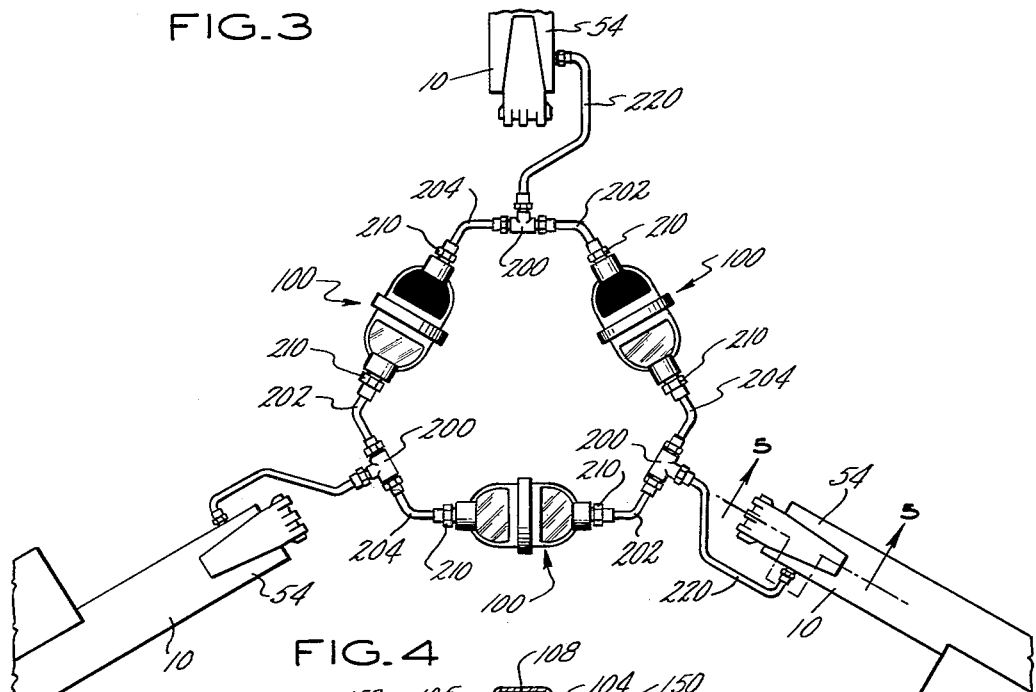
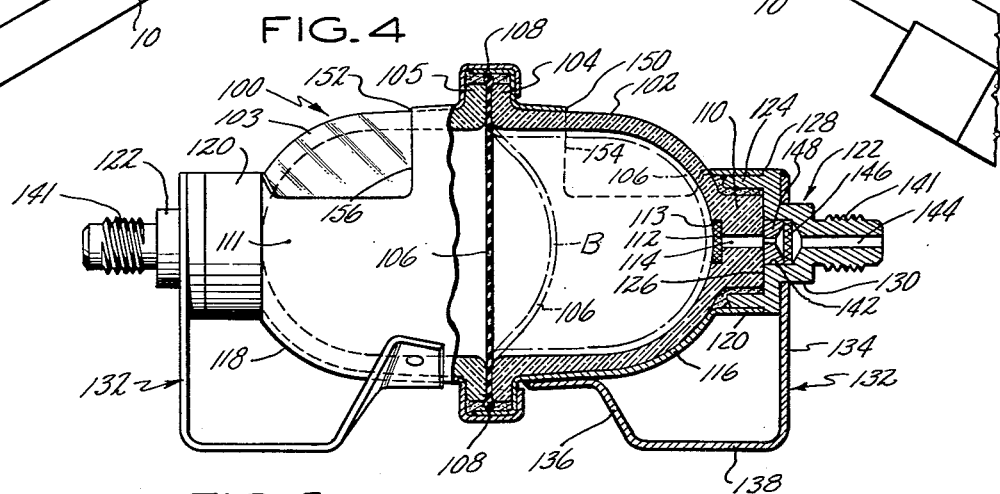
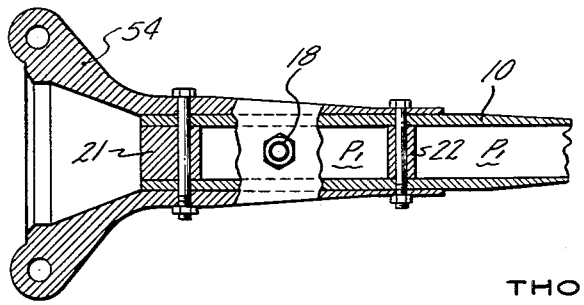
INVENTOR
THOMAS W. HOTCHKISS
BY Jack N. McCarthy
AGENT 3,134,445
BLADE INSPECTION SYSTEM
Thomas W. Hotchkiss, Orange, Conn., assignor to United Aircraft Corporation, East Hartford, Conn., a corporation of Delaware
Filed May 31, 1962, Ser. No. 198,877
8 Claims. (Cl. 170—160.22)

An object of this device is to provide a blade inspection indicator which is connected between adjacent blades.

Another object of this invention is to provide a differential pressure loss indicator which can be connected between two pressurized blades on a helicopter to indiccate relative pressure within the two blades.

A further object of this invention is to provide a blade inspection means whereby the indicator is connected to the pressurized portion of the blade by a self-sealing coupling.

Another object of this invention is to provide a blade pressure indicator which can be located on the main rotor hub.

A further object of this device is to provide a blade inspection means whereby each blade is connected to actuate two indicators, thus having double reliability.

Another object of this invention is to provide an indicator which can be easily viewed by an inspector.

A further object of this invention is to provide a self-sealing coupling half fitted with each blade which would enable the blades to be shipped and stored in a pressurized condition without an attached indicator. This would also permit a blade to be changed without disturbing the pressure in the system or in the blade. This would also permit periodic charging of the blade.

Another object of this invention is to provide a self-sealing coupling half fitted to indicating means so that the means can be easily connected to a rotor blade.

These and other objects and advantages of the invention will be evident hereinafter in connection with the following detailed description of a preferred embodiment of the invention shown in the accompanying drawings.

FIG. 1 is a side elevation of one half of a rotor head showing the location of the differential indicator on the lower plate;

FIG. 2 is a top view of a section of the rotor head with the top plate broken away to show the mounting of the differential indicators;

FIG. 3 is a schematic view showing the blade inspection system as it would be connected with a rotor having three blades;

FIG. 4 is a top view of the differential indicator with a portion broken away to show its construction; and FIG. 5 is a view taken along the line 5—5 of FIG. 3 showing the root end of the blade sealed and showing the self-sealing coupling half.

As viewed in FIGS. 1 and 2, the helicopter rotor head 16 is of the type shown in U.S. Pat. No. 2,774,553. The rotor head includes a spool 15 which has upper and lower flanges bolted to spaced upper and lower plates 42 and 44, respectively.

Plates 42 and 44 have three radially extending arms 52. The plates are positioned so that the three arms 52 of the upper plate are located directly above the three arms 52 of the lower plate. The arms 52 are supported intermediate their length by spacers 56 which are held in position by bolts 57. Each pair of upper and lower arms supports a rotor blade 54.

The end extremities of each pair of cooperating arms 52 have a drag hinge 60 journaled in vertically aligned apertures. Each drag hinge 60 has a transverse passage in which there is journaled a flapping hinge 70. A flapping link 74 extends outwardly from each of the flapping hinges. Each blade 54 is attached to a blade attaching sleeve 78 which is journaled for rotation about a spindle extending integrally from each flapping link 74. This provides for a pitch changing movement of each blade. A pitch changing horn 80 extends from the inboard end of each blade attaching sleeve. The free end of each pitch horn 80 is attached to a pilot operated system for control of the blades.

The rotor blades 78 have the main supporting spar thereof pressurized. The spar could have a construction similar to that shown in U.S. Patent No. 2,754,917. FIG. 5 shows a section through the root end of a blade spar 10 showing the end blocked by a form fitting blocking means 21 to maintain a pressure $P_1$ therein. The outboard end is also blocked in a similar manner to prevent leakage at that end. The blocking means 21 also serves as a spacer in this modification. Individual sealing and spacing members 22 are used around any other bolt passing through the pressurized section or blade spar 10.

A blade inspection means is provided on the rotor head to detect a loss of pressure from any of the rotor blades 78. A loss of pressure could be the result of a crack in the spar. The means is connected to each of the blades through the use of a self-sealing coupling. The self-sealing coupling half on the rotor blade provides for the blade to be pressurized and hold the pressure once the pressurizing means has been removed. The portion or half 18 of the coupling which is fixed to each of the blades is located near the root end. A system for pressurizing the blades would merely incorporate a mating portion of a self-sealing coupling so that it could mate with the portion 18 when desired. It is to be understood that both portions of the self-sealing coupling are self sealing when not engaged by its mate portion. When the mating portions of the coupling are engaged, a through passage is provided.

The blade inspection means includes an indicator 100 which is fixed to the rotor head 16 between each pair of adjacent blades 54. The indicator is of the pressure differential type (see FIG. 4) and comprises two dome-shaped transparent members 102 and 103 having flared out annular flanges 104 and 105 at their open ends. In assembly the flanges 104 and 105 are placed toward each other with a resilient diaphragm 106 located therebetween. The diaphragm 106 is of such a size that a bead 108 around its outer periphery is positioned at the outer mating edges of the flanges.

A thickened portion 110 extends outwardly from the outer side of the dome of each of the dome-shaped transparent members 102 and 103. A recess 112 is formed in each member 102 and 103 on its inner surface adjacent the thickened portion 110. A passageway 114 connects the bottom portion 112 of each recess to the outer end of its cooperating thickened portion 110. A filter 113 is fixed in each recess. The filter also provides a smooth continuation of the inner sides of the dome-shaped members to prevent diaphragm deformation and possible rupture.

A supporting cover 116 is placed over member 102 so that it snugly engages the dome portion. The large open end of the cover 116 flares radially outwardly past the point at which the end of the flange 104 stops and then extends straight over the ends of the flanges 104 and 105. This extension runs for a distance just short of the width of the flanges when assembled. Adhesive, or bonding compound is placed within this space formed between the extension of the cover and the ends of the flanges 104 and 105 and bead 108 so that the two dome-shaped transparent members are sealed with respect to each other and to the diaphragm 106.

A supporting cover 118 is placed over member 103 so that it snugly engages the dome portion. The large open end of the cover 118 flares radially outwardly past the point at which the end of the flange 105 stops and extends straight over the extension of the supporting cover 116 and in contact with it. This extension runs for a distance which permits the extension to be bent down about the radially extending flare of the cover 116 and fix the covers 116 and 118 in place. The covers may be fixed together by other means.

Each supporting cover 116 and 118 is formed having a small opening with an annular portion 120 which extends around the thickened portion 110 and projects to approximately the same distance from the dome. The annular part 120 is spaced from the thickened part 110 forming an annular space. An end cap 122 is positioned over each thickened portion 110. Each cap is formed having a center portion 126 abutting the end of the thickened portion of 110 and an annular end portion 128 abutting the end of annular portion 120. An annular ring 124 projects into the annular space between the annular part 120 and thickened part 110 and an adhesive, or bonding compound, is used to bond the end cap to the thickened portion 110 and to the cooperating supporting cover.

Each end cap 122 has a projection 130 which extends in a direction away from its cooperating thickened portion 110. A supporting bracket 132 is provided for each end of the indicator 100. This supporting bracket 132 has one arm 134 connected to its cooperating end cap 122 and a second arm 136 which is fixed to the cooperating supporting cover. Each supporting bracket has a flat portion 138 which is attached to a rotor head mounting adapter 140. The arm 134 has an opening which fits over the projection 130.

Each projection 130 has a necked down portion which is threaded as indicated at 141. The center portion 126 of each end cap has a small circular recess 142 formed therein. The bottom of the recess is of concave shape and has a passageway 144 extending from the recess to the outer end of the threaded portion 141. A filter 146 is positioned adjacent the bottom of the recess 142 and a restrictor 148 is placed in the recess adjacent the end of the cooperating thickened portion 110. This restrictor prevents pressure surges being transmitted to the diaphragm 106 causing possible rupture thereof.

An opening 150 is provided in the supporting cover 116 and an opening 152 is provided in the supporting cover 118. These openings provide a window for viewing the position of the diaphragm 106. Each opening is made of such a size so as to provide a view of the interior of the indicator 100 to determine the proper pressurized condition of each blade attached to the indicator. The openings 150 and 152 are cut back to a point 154 and 156, respectively, leaving a view blocking portion which permits a small movement of the diaphragm 106 to a position B (see FIG. 4) which is within a range which does not indicate a definite loss of pressure. Small variations in this range may be caused by small differences in initial charging of two cooperating blades and possible seal leakage which would vary between blades.

Each rotor head mounting adapter 140 is positioned between adjacent arms 52 of the lower plate 44. A flat portion 160 faces outwardly to provide for the mounting of the cooperating indicator. An upper flange 162 is bent inwardly and bolted into position at each end by a bolt 57 which is also used to hold the flange of a spacer 56 in position. A lower flange 164 extends inwardly under the arms 52 of the lower plate 44 and is affixed thereto by bolts. The flat portion 138 of each indicator is bolted to the flat part 160 of its rotor head mounting adapter.

The openings for viewing face outwardly from the rotor head. This makes viewing from the ground possible. The diaphragm 106 of each indicator is made of a contrasting color to the color of the indicator. This accents the appearance of a diaphragm in an opening when it extends to a position which permits it to be seen through an opening. When the diaphragm reaches its extreme indicating position, it is pressed against the surface of the dome-shaped transparent member and covers all of the opening.

Adjacent ends of adjacent indicators 100 are connected to a connector 200 which is positioned below the intermediate arm 52 of the lower plate 44. The connector 200 is merely a T-type unit. One leg of the T is connected by a conduit 202 to the adjacent threaded portion 141 of one adjacent indicator. Another leg of the T is connected by a conduit 204 to the adjacent threaded portion 141 of the other adjacent indicator.

Conduit 202 is fixed to the bottom of the arm 52 by a bracket 206 which is located near the connector 200. Conduit 204 is fixed to the bottom of the arm 52 by a bracket 208. The ends of the conduits 202 and 204 fixed to the connector 200 are done so by brazing, however, any known connecting means desired can be used. Each end of the conduits 202 and 204 connected to its respective threaded portion 141 is done so by a coupling unit having a mating internally threaded portion 210.

The third leg of each T-type connector unit is connected to a flexible conduit 220. The free end of each conduit 220 has a self-sealing coupling half which will mate with the portion or half 18 which is fixed to the respective blade to be placed in the blade inspection system. A bracket 222 is attached to the side of each flapping link 74 for supporting each flexible conduit extending to each blade. The flexible conduit allows each blade to change its pitch, move about its drag axis, and flap.

*Operation*

Blades having a section to be pressurized can have the section pressurized immediately after fabrication. In this way, each section will be pressurized during storing and transportation thereby being capable of a check before installation to determine whether or not there has been a loss of pressure during either storage or transportation. A loss of pressure would indicate the lack of effectiveness of the blade sealing means or attached self-sealing coupling half. In the described arrangement it can be seen that there is a saving in the number of indicators used over a system employing an indicator on each blade.

Assuming a helicopter having three blades is to be outfitted with three pressurized blades, it is only necessary that each blade 54 be attached to its respective blade attaching sleeve 78 and to have the cooperating portion of the self-sealing coupling on the cooperating conduit 220 connected to the portion 18 affixed to the blade.

If a blade pressurized section loses pressure, the diaphragms 106 of the adjacent indicators will both be moved in a direction toward the blade located between the adjacent ends of the indicators. For example, in FIG. 3, if the top blade was to become unpressurized, the pressure in each of the other two blades would press the diaphragms 106 of the two indicators sensing a loss of pressure upwardly so that they would cover the openings 154 and 156. With the openings now covered by a color which is contrasting to the color of the indicator it is easy to see which blade has lost pressure. This is indicated in FIG. 3 by the openings being filled in as black. If one indicator should become inoperative for some reason, the system will still indicate a loss of pressure by a blade.

In the event evacuated blades are used the system would operate the same only a reverse indication would be given by the indicators. That is, the diaphragms would be moved in a direction away from the blade cracked. If a similar indication is desired the ends of the conduits 202 and 204 could be interchanged to opposite ends of each indicator.

I claim:
1. In combination in a helicopter,
   (a) a fuselage,
   (b) a rotor head mounted thereon for rotation,
   (c) two blades attached to said rotor head,
   (d) each of said blades having a pressurized section therein,
   (e) each section being pressurized to approximately the same value, and
   (f) a pressure differential indicator being connected between the pressurized section of each of said pressurized blades.

2. In combination in a helicopter,
   (a) a fuselage,
   (b) a rotor head mounted thereon for rotation,
   (c) a plurality of blades attached to said rotor head,
   (d) at least a pair of said blades having a pressurized section therein,
   (e) each section being pressurized to approximately the same value, and
   (f) a pressure differential indicator being connected between the pressurized sections of each pair of pressurized blades.

3. In combination in a helicopter,
   (a) a fuselage,
   (b) a rotor head mounted thereon for rotation,
   (c) a plurality of blades attached to said rotor head,
   (d) each of said blades having a pressurized section therein,
   (e) each section being pressurized to approximately the same value,
   (f) a pressure differential indicator being connected to said rotor head between each pair of pressurized blades, and
   (g) conduit means connecting each pressurized section to each adjacent indicator.

4. In combination in a helicopter,
   (a) a fuselage,
   (b) a rotor head mounted thereon for rotation,
   (c) a plurality of blades attached to said rotor head,
   (d) each of said blades having a pressurized section therein,
   (e) each section being pressurized to approximately the same value,
   (f) a connector on each of said blades connected to the pressurized section of its cooperating blade,
   (g) a pressure differential indicator being connected to said rotor head between each pair of pressurized blades,
   (h) conduit means connecting adjacent ends of adjacent indicators, and
   (i) each of said conduit means having a connector engaging the connector on the blade located between adjacent indicators.

5. In combination in a helicopter,
   (a) a fuselage,
   (b) a rotor head mounted thereon for rotation,
   (c) a plurality of blades attached to said rotor head,
   (d) each of said blades having a pressurized main spar therein,
   (e) each spar being pressurized to approximately the same value,
   (f) each spar having one portion of a self-sealing coupling fixed thereto,
   (g) a pressure differential indicator being connected to said rotor head between each pair of pressurized blades,
   (h) conduit means connecting adjacent ends of adjacent indicators,
   (i) each of said conduit means having a mating portion of a self-sealing coupling fixed thereto, and
   (j) each mating portion of a self-sealing coupling being connected to the portion on the spar of the blade located between the indicators having the mating portion connected thereto.

6. In combination in a helicopter,
   (a) a fuselage,
   (b) a rotor head mounted thereon for rotation,
   (c) a plurality of blades attached to said rotor head,
   (d) each of said blades having a pressurized section therein, and
   (e) pressure indicator means being connected to said rotor head between each pair of pressurized blades for indicating the loss of pressure in an adjacent blade.

7. In combination in a helicopter,
   (a) a fuselage,
   (b) a rotor head mounted thereon for rotation,
   (c) two blades attached to said rotor head,
   (d) each blade having a main supporting spar,
   (e) each spar being sealed at two locations forming a chamber therebetween,
   (f) each chamber containing approximately the same amount of pressure, and
   (g) a pressure differential indicator being connected between the pressurized chamber of each of said pressurized blades.

8. In combination in a helicopter,
   (a) a fuselage,
   (b) a rotor head mounted thereon for rotation,
   (c) two blades attached to said rotor head,
   (d) each blade having a main supporting spar,
   (e) each spar being sealed at two locations forming a chamber therebetween,
   (f) each chamber containing approximately the same amount of pressure, and
   (g) a pressure differential indicator having a member differentially subjected to the pressure in each of the pressurized chambers of each of said pressurized blades.

References Cited in the file of this patent
UNITED STATES PATENTS

| | | |
|---|---|---|
| 1,173,038 | Roschanek | Feb. 22, 1916 |
| 1,720,934 | Toleik | July 16, 1929 |
| 2,405,022 | Enos | July 30, 1946 |
| 2,665,580 | Clawson | Jan. 12, 1954 |
| 2,702,053 | Baker | Feb. 15, 1955 |
| 2,706,463 | Dunn | Apr. 19, 1955 |
| 2,754,917 | Kee | July 17, 1956 |
| 2,999,386 | Wolfe | Sept. 12, 1961 |